United States Patent [19]

Hildebrand et al.

[11] Patent Number: 4,486,226
[45] Date of Patent: Dec. 4, 1984

[54] MULTISTAGE PROCESS FOR PREPARING FERROBORON

[75] Inventors: Clair E. Hildebrand, Whippany; Franklin S. Wong, Florham Park, both of N.J.

[73] Assignee: Allied Corporation, Morris Township, Morris County, N.J.

[21] Appl. No.: 556,492

[22] Filed: Nov. 30, 1983

[51] Int. Cl.³ .............................................. C21C 5/52
[52] U.S. Cl. ...................................... 75/11; 75/10 R; 75/123 B; 75/129
[58] Field of Search .................. 75/10, 11, 129, 123 B

[56] References Cited

U.S. PATENT DOCUMENTS 4,247,528  1/1981  Dosaj .................................. 423/350
4,397,691  8/1983  Hamada ............................ 75/123 B

OTHER PUBLICATIONS

Rosenfelder, "Industrial Development of Amorphous Metal," *Chemistry & Industry*, (Aug. 15, 1983).

*Primary Examiner*—Peter D. Rosenberg
*Attorney, Agent, or Firm*—James Riesenfeld; Gerhard H. Fuchs

[57] ABSTRACT

A process for preparing ferroboron comprises first heating a mixture of boron oxide or boric acid, iron or iron oxide, carbon, and a carbohydrate to produce a foraminous char. During a subsequent two-stage reduction process in an electric or arc plasma furnace, ferroboron is produced and gaseous boric oxides are evolved. The boron values are captured as they move to the cooler regions of the furnace, resulting in high boron yields. The process is particularly useful in preparing pure and inexpensive raw material for the production of amorphous ferroalloys.

9 Claims, 1 Drawing Figure

MULTISTAGE PROCESS FOR PREPARING FERROBORON

DESCRIPTION

1. Field of the Invention

This invention relates to a process for preparing ferroboron by multistage reduction.

2. Description of the Prior Art

High-boron ferroalloys are an important segment of the amorphous metal alloys business. In order to minimize raw materials costs for these alloys, it is desirable to have an efficient, inexpensive process for preparing ferroboron.

The conventional thermite process is not well-suited for preparing ferroboron for amorphous metal production, because the ferroboron retains undesirably high aluminum content.

A process that was developed specifically for the purpose of providing low-cost ferroboron for amorphous metal alloy production was disclosed in U.S. Pat. No. 4,397,691, issued Aug. 9, 1983, to Hamada et al. Their process involves the use of a blast furnace fed with lumps of iron oxide at the top or, alternatively, a modified structure fed with preliminarily reduced iron oxide from tuyeres. The use of an electric furnace is dismissed by Hamada et al. as being too costly.

A method for producing silicon by reduction of silica in a direct arc reactor was disclosed in U.S. Pat. No. 4,247,528, issued Jan. 27, 1981, to Dosaj et al. Since, inter alia, the melting temperature of boric oxide is substantially lower than that of silicon dioxide, the disclosure of Dosaj et al. is of but limited value in guiding the preparation of ferroboron.

A recent article by Rosenfelder (*Chemistry and Industry*, Aug. 15, 1983, p. 369) discloses that an effort is underway on improving yield and power efficiency of a carbothermic process for manufacturing ferroboron with low aluminum content.

SUMMARY OF THE INVENTION

In accordance with the present invention, a process for preparing ferroboron comprises the steps of:

(a) heating, at a temperature and for a time sufficient to produce a char that includes boron oxide, a mixture comprising a boron-containing material selected from the group consisting of boron oxides, boric acid, borax, colemanite, priceite, meyerhofferite, and mixtures thereof; iron, iron oxides, and mixtures thereof; a carbonaceous reducing agent selected from the group consisting of carbon black, activated carbon, coke and mixtures thereof; and a carbohydrate selected from the group consisting of sugars, starches, celluloses and mixtures thereof;

(b) moving the char into a first reducing zone of an electric or arc plasma furnace, while heating it to a temperature sufficient to partially reduce the boron oxide;

(c) passing the material thereby produced to a second reducing zone, in which the material is further heated to a temperature sufficient to yield molten ferroboron; and (d) returning to cooler zones any vapors that are generated, whereby boron values in the vapors are retained in the cooler zones.

The process permits low-carbon (i.e., <0.5%), a high-boron (i.e., nearly stoichiometric FeB) ferroboron to be produced at lower cost than was possible with prior art methods. Boron yields as high as 90% or more can be achieved by retaining in the furnace the gaseous boron values that are evolved during the process. At the same time, additional savings can be realized by using, as raw materials, boric acid or boron-containing minerals, instead of boric oxide, and iron oxides, instead of iron. Energy costs are minimized by using waste heat to dehydrate the boric acid and to pre-reduce the iron oxide.

BRIEF DESCRIPTION OF THE DRAWING

The FIGURE depicts a schematic, in partial cross section, of an apparatus suitable for practicing the process of this invention.

DETAILED DESCRIPTION OF THE INVENTION

Figure 1:
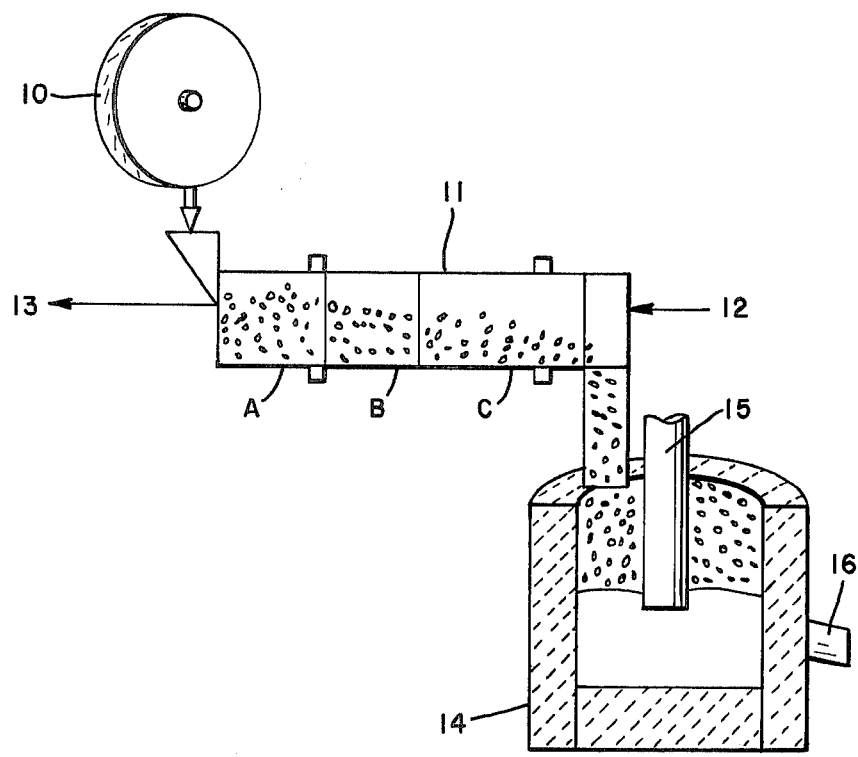

This invention provides a process for producing relatively low-cost ferroboron, primarily for use in the production of amorphous ferroalloys. The process involves first heating a mixture of a boron compound, iron and/or iron oxide, a carbonaceous reducing agent, and a carbohydrate to produce a char. The char is heated in an electric or arc plasma furnace, first at a temperature sufficient to partially reduce the boron oxide, then at a higher temperature to yield molten ferroboron. The material is heated and reduced as it moves in one direction through the furnace; boron oxide vapors evolved during the reduction are retained by the incoming feed as the vapors move in the opposite direction (to the cooler zones). Retention of the boron values provides the key to high boron yield.

In a preferred embodiment of the process, the boron-containing material is boric acid and the carbohydrate is a sugar. The sugar functions as a binding agent and generates a large surface area that is highly reactive during dehydration. Although yields are higher when iron is used, rather than iron oxide, in practice, one would use the least expensive iron source that can meet the alloy purity requirements of the particular application. Carbon black is a preferred reducing agent; however, other forms of carbon, as well as various organic waste materials, such as wood chips, are also suitable. In any case, the feed stream quantities are adjusted so that a 100% stoichiometric conversion of mineral oxides with the carbon, no $CO_2$ is formed. The feed composition is either stoichiometric or has a slight excess of boron to compensate for boron losses during the process. About 5–9% of the boron is lost during char preparation.

Another constraint on the feed composition is the need to form a rigid, non-sticky char that does not, on further heating, undergo plastic transformation which could plug the furnace. To form the char, the feed material is first mixed and pelletized, then heated at temperatures above 100° C., preferably about 300° C., to char the carbohydrate and to assure water removal. Alternatively, the char may first be produced in a separate enclosure, then crushed into lumps and introduced into the furnace. In that case, temperatures above 300° C. are to be avoided, because they result in increased boron loss.

Optimum results depend on control of the char pelletization process. Preferably, the sugar/carbon ratio is chosen so that the sugar provides about 20–40% of the carbon atoms. Preferably, the char has pellets whose largest dimension is about 10% to 15% of the furnace diameter to insure smooth movement of the packed bed.

The individual particles that comprise the pellets are substantially smaller. The feed mass should be hard enough so that not many fines are generated during any feed preparation step, since fines can cause the packed column to plug. Pelletization minimizes generation of fines, as does the use of carbon together with sugar; i.e., 100% sugar yields a friable mass that leads to formation of fines.

The char mix flows into a first reducing zone of the furnace, where the metal oxides are partially reduced. As the material continues to move through the furnace, the temperature increases and the oxides are finally reduced to form molten ferroboron, which is removed from a tap at the hot end of the furnace.

Furnace temperatures to be used in the present process depend on the desired stoichiometry of the ferroboron product. For example, low-boron ferroboron eutectics may form at temperatures as low as 1161° C., while high-boron eutectics require higher temperatures. The eutectic temperature of $FeB_2$ is about 1500° C. Thus, to obtain high-boron product, the second reduction preferably takes place at a temperature of at least about 1500° C. Excessive temperatures should be avoided, however, to minimize boron losses. The temperature in the first reducing zone is preferably in the range from about 1000°–1300° C.

Throughout the process, a char bed is maintained above the melt, and boron oxides that are evolved in the hotter regions are first captured on the cooler char and then recycled. Optimum results are achieved when the bed turnovers/time of the material in the furnace is less than about 0.5/hour. Higher space velocity (more bed turnovers/time) generally reduces yields. As space velocity decreases, however, so does production.

Although we do not wish to be bound by any theory, we believe that the following reactions take place during the process of this invention:

Dehydration:

$$H_3BO_3 \longrightarrow HBO_2 + H_2O$$

$$2HBO_2 \longrightarrow B_2O_3 + H_2O$$

Initial Reduction:

$$2Fe_2O_3 + C_{12}H_{22}O_{11} + 4H_3BO_3 \longrightarrow$$
$$4FeO + 2B_2O_3 + 12CO + 17H_2O$$

Final Reduction:

$$4FeO + 2B_2O_3 + 10C \longrightarrow 4FeB + 10CO$$

Escape (of boron oxide):

$$B_2O_3 (L) \longrightarrow B_2O_3 (G)$$

$$B_2O_3 (L) + C \longrightarrow (BO)_2 + CO$$

Capture (of boron oxide):

$$B_2O_3 (G) \longrightarrow B_2O_3 (L)$$

$$2(BO)_2 + 5C \longrightarrow B_4C + 4CO$$

FIG. 1 depicts, in partial cross section, a schematic of an apparatus suitable for practicing the present process. The raw materials, together with water or other pelletizing agent in an amount sufficient to cause agglomeration, are fed to the disk pelletizer 10. After the materials have been pelletized, they proceed to rotary kiln 11, where in zones A, B, and C they are successively dehydrated, charred, and partially reduced. Air 12 is fed to the rotatry kiln at one end and exhaust gas 13 is given off at the other end. After partial reduction in rotary kiln 11, the material is fed to furnace 14. Preferably, the furnace is an arc furnace having a submerged electrode 15. Alternatively, the furnace could be heated with an induction heater or plasma arc. As the material travels down through furnace 14, it is heated and reduced. Gaseous boron oxide is captured in the char as it rises to the cooler sections. Molten ferroboron product is removed at tap 16.

The following examples are presented in order to provide a more complete understanding of the invention. The specific techniques, conditions, materials, and reported data set forth to illustrate the principles and practices of the invention are exemplary and should not be construed as limiting the scope of the invention.

EXAMPLE 1

Sugar, carbon, boric acid, and iron in amounts having weight percentages of 9.0, 8.8, 43.2, and 39.0, respectively, were first blended, then heated at a temperature of about 275° until constant weight was maintained. After cooling to ambient temperature, this "prechar" material was crushed and sieved to minus 12.7 mm and plus No. 10 U.S. sieve (2.0 mm). The prechar lumps were used as a feed for a vertical graphite induction furnace. As the bed moved down into hotter zones of the furnace, the prechar was replenished at the top of the furnace. The bed space velocity was adjusted to provide about 0.22 bed turnovers per hour. The product ferroboron comprised 13.6% boron, and overall yield was 77%.

EXAMPLES 2–4

The process of Example 1 was repeated with variations in feed composition and space velocity. Parameters and results of these examples and of Example 1 are shown in the table. Note that Example 4 was run at two values of space velocity.

TABLE

| Ex. | INITIAL FEED COMPOSITION (Wt %) | | | | | Bed Turnovers/ Time (hr$^{-1}$) | % Boron in FeB | % Carbon in FeB | Yield (%) |
| --- | --- | --- | --- | --- | --- | --- | --- | --- | --- |
| | Sugar | Carbon | $H_3BO_3$ | Fe | $Fe_2O_3$ | | | | |
| 1 | 9.0 | 8.8 | 43.2 | 39.0 | | .22 | 13.6 | 0.34 | 77 |
| 2 | 9.0 | 8.8 | 43.2 | 39.0 | | .18 | 13.7 | 0.30 | 86 |
| 3 | 12.5 | 12.4 | 33.7 | | 41.4 | .18 | 13.9 | 0.29 | 68 |
| 4,4' | 12.1 | 12.7 | 32.3 | | 42.9 | .08,.46 | 15.4 | | 80,54 |

We claim:
1. A process for preparing ferroboron comprising the steps of:

(a) heating a mixture comprising
  (i) a boron-containing material selected from the group consisting of boron oxides, boric acid, borax, colemanite, priceite, meyerhofferite, and mixtures thereof,
  (ii) iron, iron oxides, and mixtures thereof,
  (iii) a carbonaceous reducing agent selected from the group consisting of carbon black, activated carbon, coke, and mixtures thereof, and
  (iv) a carbohydrate selected from the group consisting of sugars, starches, celluloses, and mixtures thereof at a temperature and for a time sufficient to produce a char that includes boron oxide;
(b) moving the char into a first reducing zone of an electric or arc plasma furnace, while heating it to a temperature sufficient to partially reduce the boron oxide;
(c) passing the material thereby produced to a second reducing zone, in which the material is further heated to a temperature sufficient to yield molten ferroboron; and
(d) returning to cooler zones any vapors that are generated, whereby boron values in the vapors are retained in the cooler zones.

2. The process of claim 1 in which the boron compound is boric acid.

3. The process of claim 1 in which the carbohydrate is a sugar.

4. The process of claim 1 in which the char is produced in the furnace.

5. The process of claim 1 in which the char is first produced and then introduced into the furnace.

6. The process of claim 1 in which the heating in the furnace is accomplished with a submerged arc.

7. The process of claim 1 in which the temperature in the first reducing zone is about 1000°–1300° C.

8. The process of claim 1 in which the temperature in the second reducing zone is at least about 1500° C.

9. The process of claim 1 in which the material moves through the zones of the furnace with bed turnovers/time less than about 0.5 hour$^{-1}$.

* * * * *